United States Patent [19]
Watanabe et al.

[11] Patent Number: 5,446,331
[45] Date of Patent: Aug. 29, 1995

[54] ULTRASONIC WAVE MOTOR

[75] Inventors: Tsuneo Watanabe, Kawasaki; Tadao Takagi, Yokohama; Daisuke Saya, Urayasu; Ryouichi Suganuma, Yokohama; Kunihiro Fukino, Fujisawa, all of Japan

[73] Assignee: Nikon Corporation, Tokyo, Japan

[21] Appl. No.: 339,283

[22] Filed: Nov. 7, 1994

Related U.S. Application Data

[63] Continuation of Ser. No. 16,841, Feb. 12, 1993, abandoned.

[30] Foreign Application Priority Data

Mar. 5, 1992 [JP] Japan ................................. 4-048283

[51] Int. Cl.⁶ ............................................. H01L 41/08
[52] U.S. Cl. ...................................................... 310/323
[58] Field of Search .................................. 310/323, 328

[56] References Cited

U.S. PATENT DOCUMENTS

| | | | |
|---|---|---|---|
| 4,743,788 | 5/1988 | Takagi et al. | 310/323 |
| 4,743,791 | 5/1988 | Kawai | 310/323 |
| 4,871,937 | 10/1989 | Kawai | 310/323 |
| 4,914,722 | 4/1990 | Holden et al. | 310/323 |
| 5,264,753 | 11/1993 | Mukohjima et al. | 310/323 |

FOREIGN PATENT DOCUMENTS 1-234068  9/1989  Japan.

*Primary Examiner*—Mark O. Budd
*Attorney, Agent, or Firm*—Shapiro and Shapiro

[57] ABSTRACT

An ultrasonic wave motor comprises a vibration member for generating a travelling vibration wave, a movable body to be driven by the vibration member, and a pressing mechanism having a spring member which abuts against at least one of the vibration member and the movable body and presses the vibration member and the movable body toward each other. The spring member is formed by a resilient plate member.

20 Claims, 10 Drawing Sheets

ULTRASONIC WAVE MOTOR

This is a continuation of application Ser. No. 08/016,841 filed Feb. 12, 1993, now abandoned.

BACKGROUND OF THE INVENTION

1. Field of the Invention

The present invention relates to an ultrasonic wave motor which drives a movable body by a vibration member which generates a travelling vibration wave.

2. Related Background Art

An ultrasonic wave motor is usually constructed to drive a movable body by a vibration member which generates a travelling vibration wave.

In such an ultrasonic wave motor, the vibration member and the movable body are press-contacted by a pressing mechanism such as a coiled spring or a dish-shaped spring.

FIG. 18 shows a ring-shaped ultrasonic wave motor having a pressing mechanism comprising a plurality of coiled springs. Numeral 11 denotes a holder.

A support member 13 is fitted in the holder 11 and a stator 15 is supported at a center of the support member 13.

A piezoelectric element 17 is integrally bonded to a bottom surface of the stator 15 and a vibration member 19 is formed by the stator 15 and the piezoelectric element 17.

A rotor 21 is rotatably arranged, with a restriction in a radial direction, on a top of the support member 13 through a bearing 28b.

A slide member 23 is integrally bonded to a bottom surface of the rotor 21 and a movable body 25 is formed by the rotor 21 and the slide member 23.

A rotation transmission member 26 is mounted on the top of the rotor 21 integrally with the rotor 21, and the rotation of the rotor 21 is transmitted externally by a notch 26a.

A pressure control member 29 is screwed to the top of the holder 11, and a plurality of coiled springs 31 which form a pressing mechanism are arranged at a predetermined pitch angle between the pressure control member 29 and a pressure transmission member 27.

A thrust bearing 28a is provided between the pressure transmission member 27 and the rotation transmission member 26.

In such an ultrasonic wave motor, when a predetermined voltage is applied to the piezoelectric element 17, a travelling vibration wave is generated in the stator 15, and the slide member 23 and the rotor 21 are rotated by the travelling vibration wave.

The pressure of the coiled spring 31 can be adjusted by rotating the pressure control member 29 to vertically move it to adjust a gap between the pressure control member 29 and the pressure transmission member 27.

FIG. 19 shows an ultrasonic wave motor having a pressing mechanism comprising single coiled spring. In the present ultrasonic wave motor, an integral coiled spring 33 is arranged between the pressure control member 29 and the pressure transmission member 27.

FIG. 20 shows an ultrasonic wave motor having a pressing mechanism comprising a dish-shaped spring. In the present ultrasonic wave motor, a pair of dish-shaped springs 35 are arranged between the pressure control member 29 and the pressure transmission member 27.

In the ultrasonic wave motor which uses the coiled springs 31 or 33 or the dish-shaped spring 35, it is relatively easy to select a small spring constant, and even if the flexure of the spring changes at an initial pressure adjustment or during the use, a variation of the pressure can be made small and an ultrasonic wave motor having a relatively stable performance is provided.

In the ultrasonic wave motor which used the dish-shaped spring 35, the spring constant or a relation between the flexure and the load is not linear but it is a function of the flexure. Accordingly, the variation of the pressure to the variation of the flexure 6 can be made further small by designing such that the dish-shaped spring 35 is used in an area in which the spring coefficient K(δ) is substantially constant.

However, in the prior art ultrasonic wave motor, the variation of the pressure is made relatively small but no consideration is paid to the uniformity of the pressure in the contact plane of the vibration member 19 and the movable body 25.

For example, in the ring-shaped ultrasonic wave motor, it is especially desirable that the pressure acts uniformly circumferentially in the ring-shaped contact plane of the stator and the rotor. If it does not uniformly act, it causes instability of performance such as irregular rotation.

It is also desirable that the pressure is uniform radially, but a significant problem does not arise because of a small width in the radial direction.

The uniformity of the pressure in the contact plane is further discussed below.

As shown in FIG. 19, when the single coiled spring 33 is used, the windings are dense and coarse in the vicinity of the bottom winding of the coiled spring 33, and there is a difference between pressures at a point a and a point b of the coiled spring 33. As a result, circumferential load is not uniform.

As shown in FIG. 18, where a plurality of coiled springs 31 are used, a number of small coiled springs are circumferentially arranged. Thus, due to a variation of load by a difference between solidities of the coiled springs 31, there is a difference between pressures and the circumferential load is not uniform.

As shown in FIG. 20, where the dish-shaped spring 35 is used, the pressure transmission member 27 and the dish-shaped spring 35 make circular line contact at a point c and the pressure transmission member 27 receives a pressure from the contact area. Because of the line contact, there are portions at which the pressure transmission member 27 does not contact the dish-shaped spring 35 if there is a circumferential variation in the height of the dish-shaped spring 35. As a result, a difference between pressures is created and a circumferential load is not uniform.

The prior art ultrasonic wave motor further has the following disadvantages.

In the ultrasonic wave motor which uses the coiled springs 31 or 33, when the spring coefficient is to be reduced to reduce the variation of load, it is necessary to increase the flexure, but when the flexure is increased, the total length of the coiled springs 31 or 33 increases and the size of the ultrasonic wave motor including the pressing mechanism increases. As a result, it is very difficult to accommodate the ultrasonic wave motor in a limited space of a camera or an office automation equipment.

In the ultrasonic wave motor which uses the dish-shaped spring 35, a high machining precision is required for the dish-shaped spring 35.

In the dish-shaped spring 35, as shown in FIG. 21, the relation between the flexure δ and the load F is not linear, and if the shape of the dish-shaped spring 35 is changed, the relation between the flexure and the load also changes as shown by a, b and c in FIG. 21.

Accordingly, if the shape is determined such that the relation between the flexure and the load is represented by c of FIG. 21 and the spring is used in a flexure range A, the dish-shaped spring exhibits a very small load variation even if the flexure changes to some extent. However, if the work range deviates, the characteristic is not the initially intended one shown by c in FIG. 21 but the one shown by a, b or d. Thus, there is a high risk that the load significantly changes for the variation of flexure in the range A, and hence a high machining precision is required for the dish-shaped spring.

SUMMARY OF THE INVENTION

It is an object of the present invention to provide an ultrasonic wave motor which uniformly presses a vibration member and a movable body in a contact plane, and which has an easy-to-machine and compact pressing mechanism.

The ultrasonic wave motor of the present invention comprises a vibration member for generating a travelling vibration wave, a movable body to be driven by the vibration member and a pressing mechanism for press-contacting the vibration member and the movable body. The pressing mechanism is formed by a plurality of leaf springs arranged along a direction of travel of the travelling vibration wave.

In the ultrasonic wave motor of the present invention, the leaf springs are separated from each other.

In the ultrasonic wave motor of the present invention, the leaf springs are formed by integrally projecting them from one plate.

In the ultrasonic wave motor of the present invention, the leaf springs project in the direction of travel of the travelling vibration wave.

In the ultrasonic wave motor of the present invention, the leaf springs project perpendicularly to the direction of travel of the travelling vibration wave.

In the ultrasonic wave motor of the present invention, the vibration member and the movable body are press-contacted by the leaf springs so that the travelling vibration wave from the vibration member is transmitted to the movable body.

DETAILED DESCRIPTION OF THE PREFERRED EMBODIMENTS

The preferred embodiments of the present invention are now described in detail with reference to the drawings.

Figure 1:
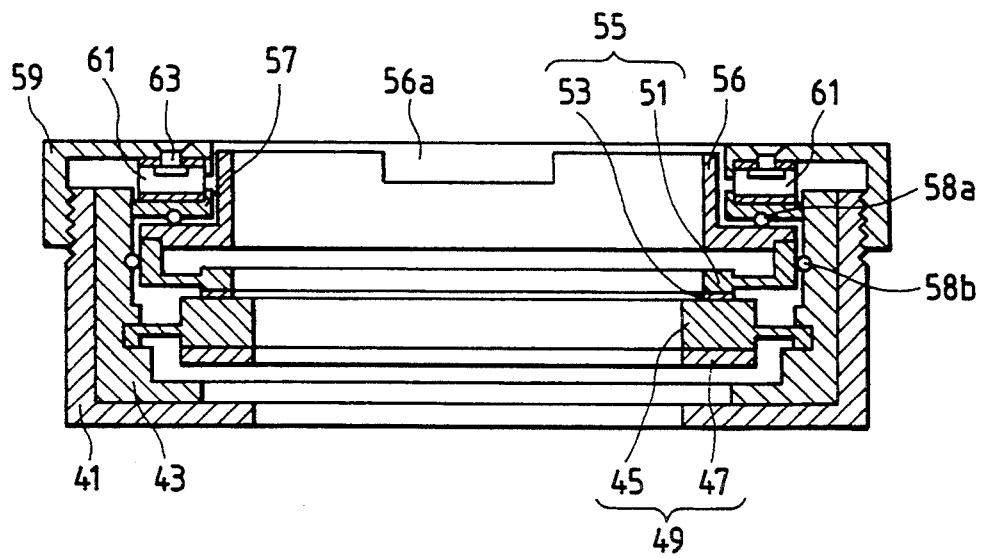
FIG. 1 shows a sectional view of a first embodiment of an ultrasonic wave motor of the present invention.

FIG. 1 shows a first embodiment of the ultrasonic wave motor of the present invention. Numeral 41 denotes a cylindrical holder.

A support member 43 is fitted in the holder 41, and a stator 45 is supported at a center of the support member 43.

A piezoelectric element 47 is integrally bonded to a bottom surface of the stator 45, and a vibration member 49 is formed by the stator 45 and the piezoelectric element 47.

A rotor 51 is rotatably arranged, with a limitation in a radial direction, on the top of the support member 43 through a bearing 58b.

A slide member 53 is integrally bonded to a bottom surface of the rotor 51, and a movable body 55 is formed by the rotor 51 and the slide member 53.

A rotation transfer member 56 is mounted on the top of the rotor 51 integrally with the rotor 51 and the rotation by the rotor is transmitted externally by coupling a motive force transmission member (not shown) to a notch 56a.

A pressure control member 59 is screwed to the top of the holder 41, and a plurality of leaf springs 61 which form a pressing mechanism are arranged at a predetermined pitch angle between the pressure control member 59 and the pressure transmission member 57.

A thrust bearing 58a is provided between the pressure transmission member 57 and a rotation transmission member 56.

Figure 2:
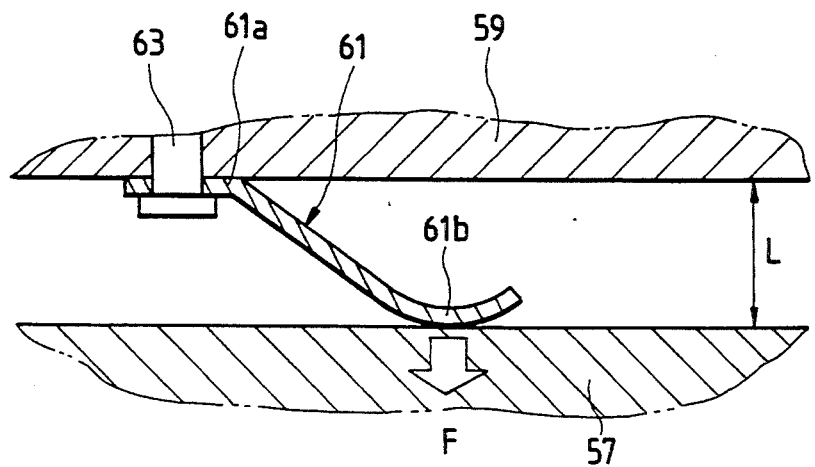
FIG. 2 shows a sectional view of a leaf spring of the ultrasonic wave motor of FIG. 1, viewed radially.

FIG. 2 shows the leaf springs 61 arranged between the pressure control member 59 and the pressure transmission member 57, viewed radially. A support 61a is formed at one end of the leaf spring 61, and an arc 61b is formed at the other end.

The support 61a is fixed to the pressure control member 59 by a pin 63, and an outer periphery of the arc 61b abuts against the top of the pressure transmission member 57 with a pressure F.

In the present embodiment, the leaf spring 61 is formed by pressing a plate such as stainless steel, brass or bronze.

In the ultrasonic wave motor described above, when a predetermined voltage is applied to the piezoelectric element 47, a travelling vibration wave is generated in the stator 45, and the slide member 53 and the rotor 51 are rotated by the travelling vibration wave.

The pressure F of the leaf springs 61 can be adjusted by rotating the pressure control member 59 to vertically move it to adjust a gap L between the pressure control member 59 and the pressure transmission member 57.

In the ultrasonic wave motor thus constructed, the vibration member 49 and the movable body 55 are pressured by the leaf springs 61. Thus, a variation of load may be reduced by using leaf springs 61 having a small spring coefficient.

The spring coefficient of the leaf springs 61 may be readily changed by changing the plate thickness or a distance to an acting point, and it is set to an appropriate spring coefficient depending on a pressure precision required for the ultrasonic wave motor.

Leaf springs 61 of the same shape may be mass-produced by pressing so that the variation of loads of the leaf springs 61 is very small and uniform pressurization is attained in the contact plane of the vibration member 49 and the movable body 55.

When the leaf springs 61 are used instead of the coiled springs, the outer dimensions thereof are very small and the gap L is small. As a result, an ultrasonic wave motor of compact size is attained.

A freedom of design is relatively large in determining the spring coefficient of the leaf spring 61, and it is easy to reduce the spring coefficient to precisely initially set the pressures to the vibration member 49 and the movable body 55 or reduce the aging change of the pressure. Accordingly, an ultrasonic wave motor having a stable characteristic is provided.

Further, unlike the dish-shaped spring, the leaf spring 61 has a linear spring characteristic. Accordingly, a risk of an abrupt change of the spring characteristic by a dimensional error is solved.

Since the leaf spring 61 may take various shapes with ease without losing the above advantages, the freedom of design is significantly enhanced.

Figure 3:
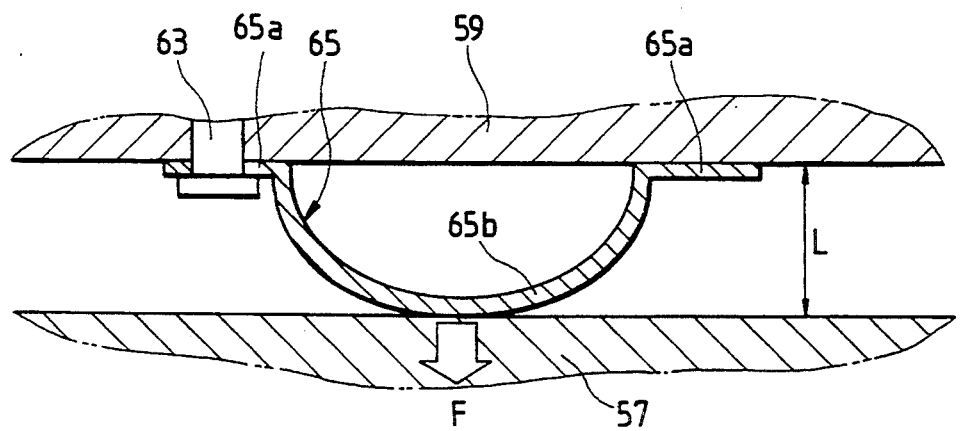
FIG. 3 shows a sectional view of a leaf spring of a second embodiment of the ultrasonic wave motor of the present invention, viewed radially.

FIG. 3 shows a leaf spring of a second embodiment of the ultrasonic wave motor of the present invention. In the present embodiment, supports 65a are formed at the opposite ends of the leaf spring 65, and a semi-oval curved surface 65b is formed between the supports 65a.

One of the supports 65a is fixed to the pressure control member 59 by a pin 63 and the other support 65a abuts against the pressure control member 59.

An outer periphery of the curved surface 65b abuts against the top of the pressure transmission member 57 with a pressure F.

Substantially the same effects as those of the first embodiment are attained in the present embodiment.

Figure 4:
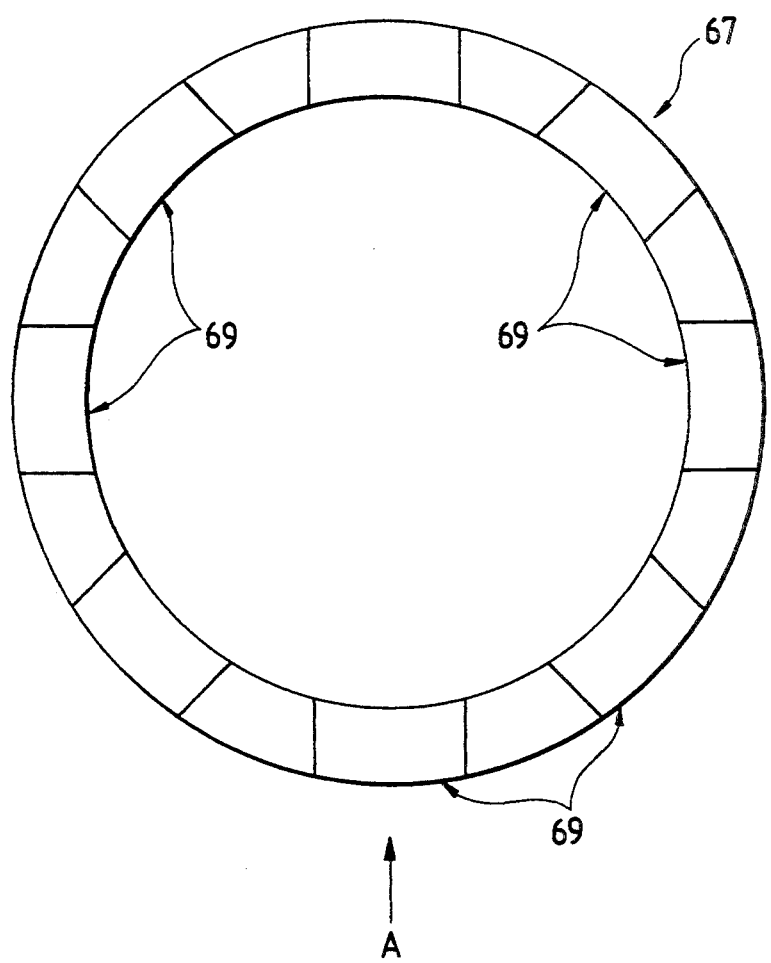
FIG. 4 shows a top view of a leaf spring of a third embodiment of the ultrasonic wave motor of the present invention.
Figure 5:
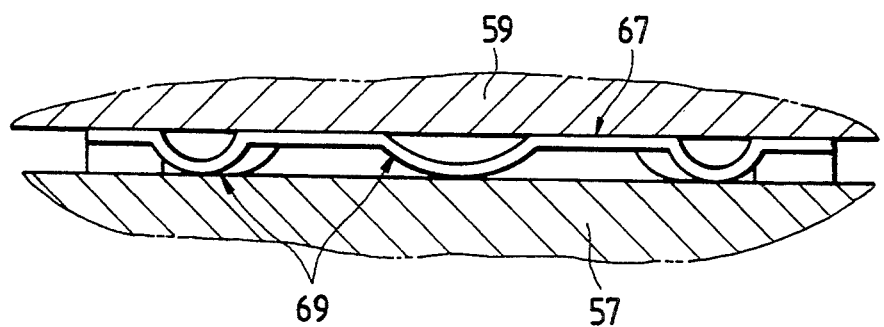
FIG. 5 shows a side elevational view of the leaf spring of FIG. 4, viewed in a direction A in FIG. 4.

FIG. 4 shows a shape of a leaf spring in a third embodiment of the present invention.

A plurality of semi-oval projections are formed on a ring-shaped plate 67 at a predetermined pitch angle to form a plurality of leaf springs 69.

Those leaf springs act in substantially the same manner as the semi-oval leaf spring shown in FIG. 3.

The present embodiment attains substantially the same effects as those of the first embodiment. In the present embodiment, since the leaf springs 69 are formed integrally with the ring-shaped plate 67, it is not necessary to fix the leaf springs to the pressure control member by the pins as they are in the previous embodiment, and the assembling work is improved.

Figure 6:
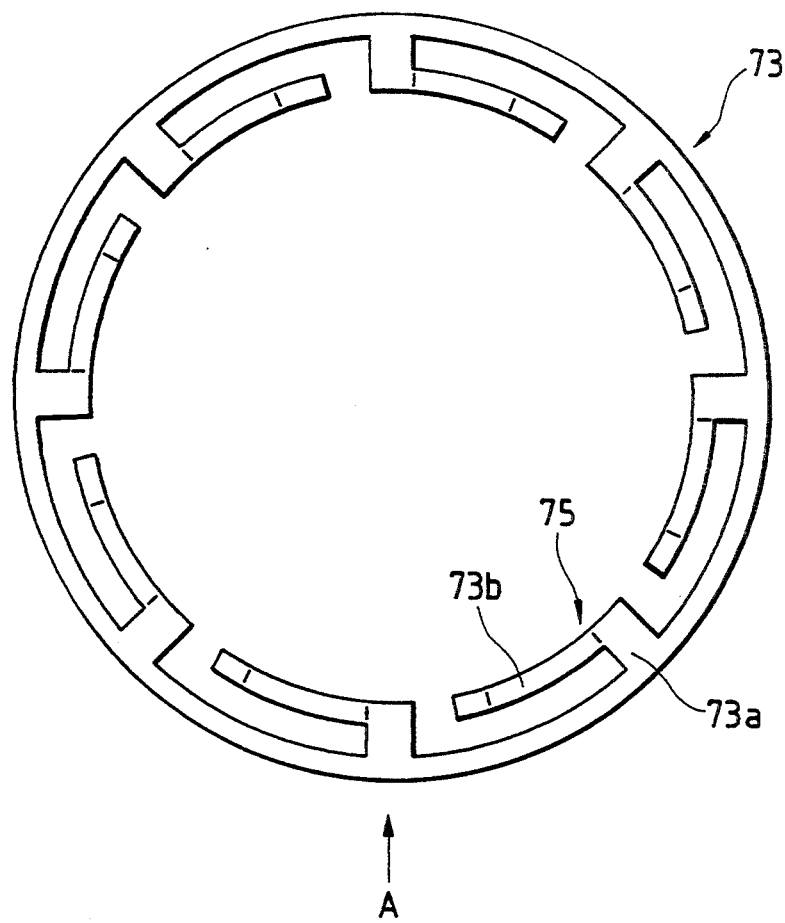
FIG. 6 shows a top view of a leaf spring of a fourth embodiment of the ultrasonic wave motor of the present invention.

FIG. 6 shows a shape of a leaf spring in a fourth embodiment of the present invention. A plurality of leaf springs 75 comprising projections 73a projecting toward a center and springs 73b extending circumferentially from ends of the projections 73a are integrally formed on a ring-shaped plate 73 at a constant pitch.

Figure 7:
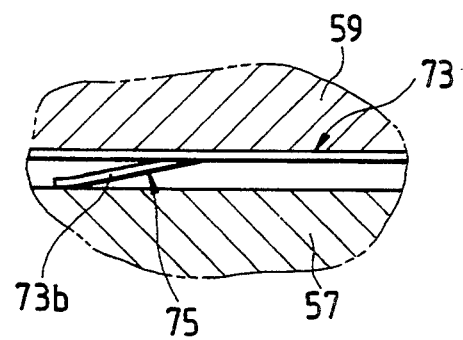
FIG. 7 shows a side elevational view of the leaf spring of FIG. 6, viewed in a direction A in FIG. 6.

As shown in FIG. 7, the spring 73b presses the pressure transmission member 57, to transmit the pressure of the pressure control member 59 to the movable body 55 in FIG. 1.

The present embodiment attains substantially the same effects as those of the third embodiment. In the present embodiment, since the length of the leaf spring 75 may be long, it is easy to reduce the spring coefficient to reduce the load variation.

Figure 8:
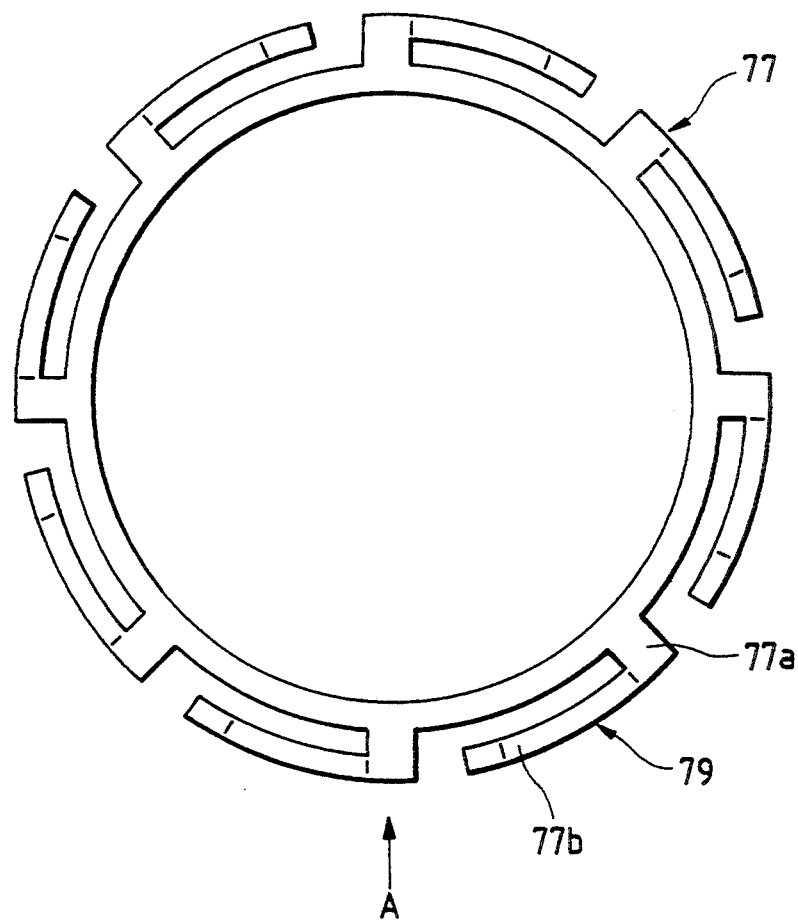
FIG. 8 shows a top view of a leaf spring of a fifth embodiment of the ultrasonic wave motor of the present invention.

FIG. 8 shows a shape of a leaf spring in a fifth embodiment of the present invention.

A plurality of leaf springs 79 comprising projections 77a projecting radially outward and springs 77b circumferentially extending from ends of the projections 77a are integrally formed on a ring-shaped plate 77 at a constant pitch.

Figure 9:
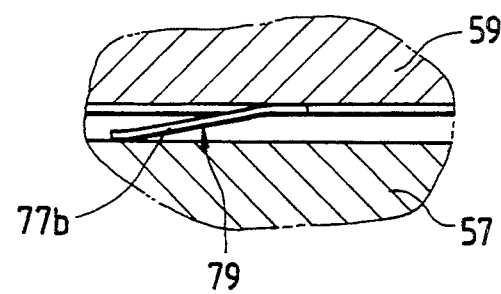
FIG. 9 shows a side elevational view of the leaf spring of FIG. 8, viewed in a direction A in FIG. 8.

As shown in FIG. 9, the springs 77b press the pressure transmission member 57, to transmit the pressure of the pressure control member 59 to the movable body 55 in FIG. 1.

The present embodiment attains substantially the same effects as those of the fourth embodiment.

Figure 10:
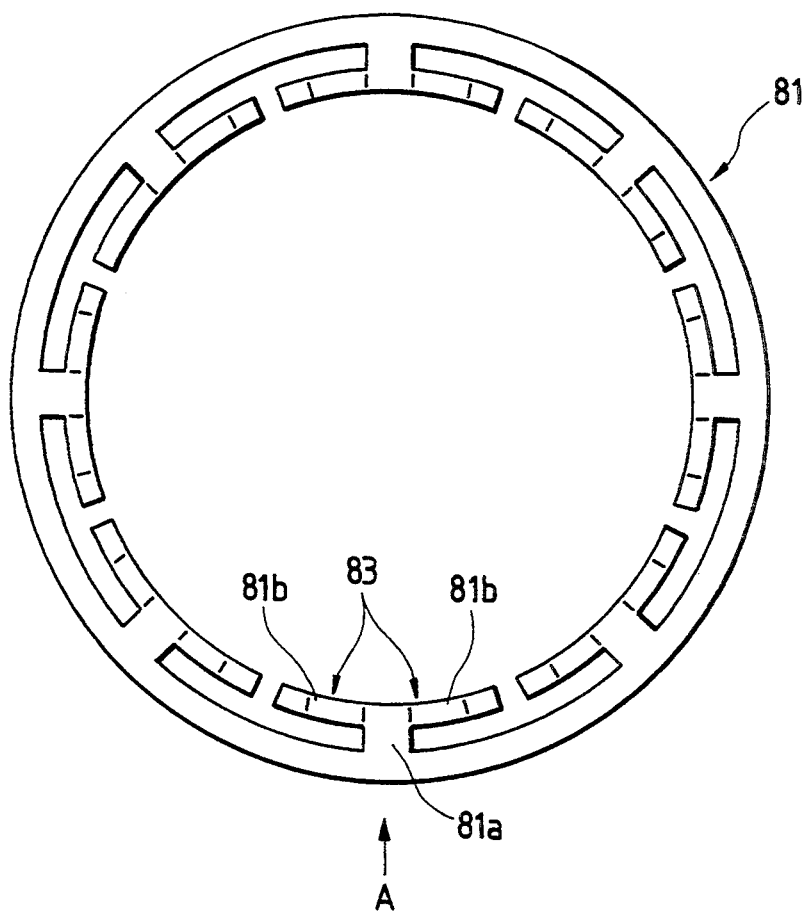
FIG. 10 shows a top view of a leaf spring of a sixth embodiment of the ultrasonic wave motor of the present invention.

FIG. 10 shows a shape of a leaf spring in a sixth embodiment of the present invention.

A plurality of leaf springs 83 comprising projections 81a projecting toward a center and springs 81b circumferentially extending from ends of the projections to the opposite sides are integrally formed on a ring-shaped plate 81 at a constant pitch.

Figure 11:
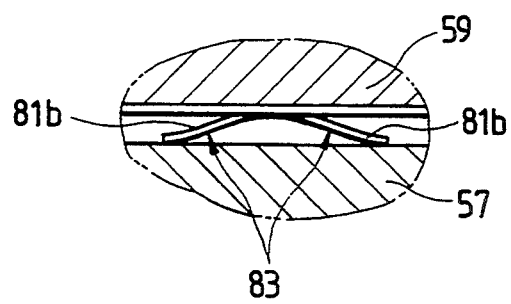
FIG. 11 shows a side elevational view of the leaf spring of FIG. 10, viewed in a direction A in FIG. 10.

As shown in FIG. 11, the springs 81b press the pressure transmission member 57, to transmit the pressure of the pressure control member 59 to the movable body 55.

The present embodiment attains substantially the same effects as those of the fifth embodiment. In the present embodiment, since the springs 81b are formed on the opposite sides of the projections 81a, it is easy to increase the number of leaf springs 83.

By increasing the number of leaf springs 83, action points of the load increase so that the vibration member 49 and the movable body 55 can be more uniformly pressed in the contact plane.

Figure 12:
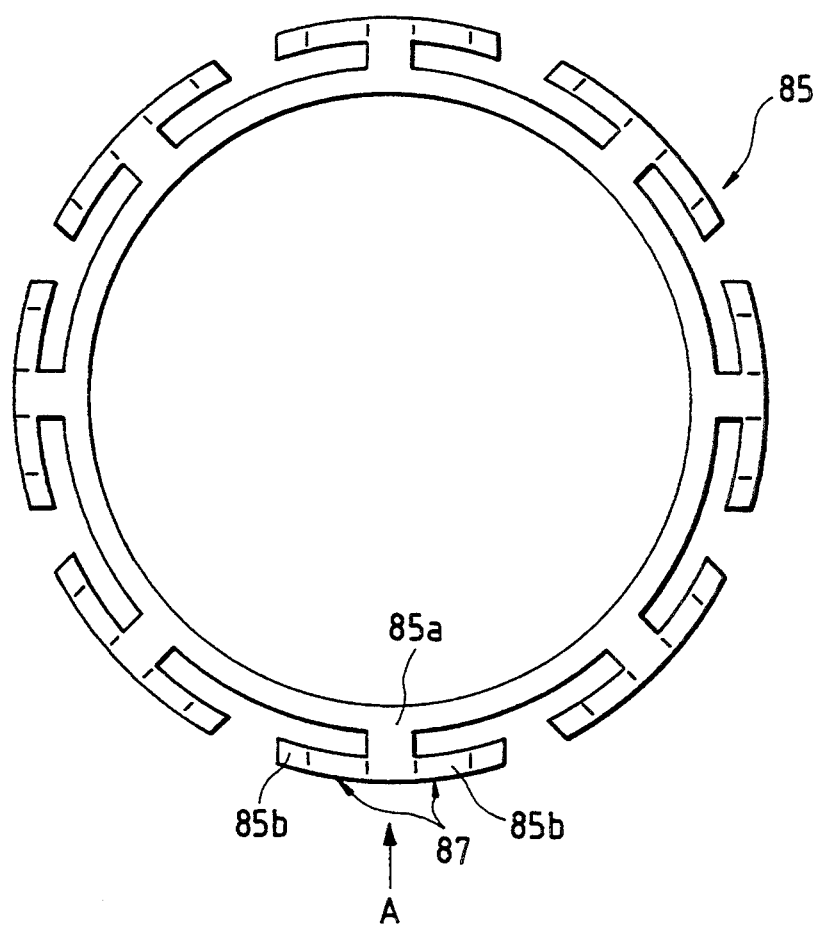
FIG. 12 shows a top view of a leaf spring of a seventh embodiment of the ultrasonic wave motor of the present invention.

FIG. 12 shows a shape of a leaf spring in a seventh embodiment of the present invention.

A plurality of leaf springs 87 comprising projections 85a projecting outward radially and springs 85b circumferentially extending from ends of the projections 85a toward the opposite sides are integrally formed on a ring-shaped plate 85 at a fixed pitch.

Figure 13:
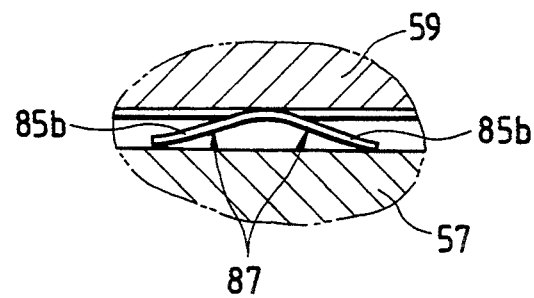
FIG. 13 shows a side elevational view of the leaf spring of FIG. 12, viewed in a direction A in FIG. 12.

As shown in FIG. 13, the springs 85b press the pressure transmission member 57, to transmit the pressure of the pressure control member 59 to the movable body 55 in FIG. 1.

The present embodiment attains substantially the same effects as those of the sixth embodiment.

Figure 14:
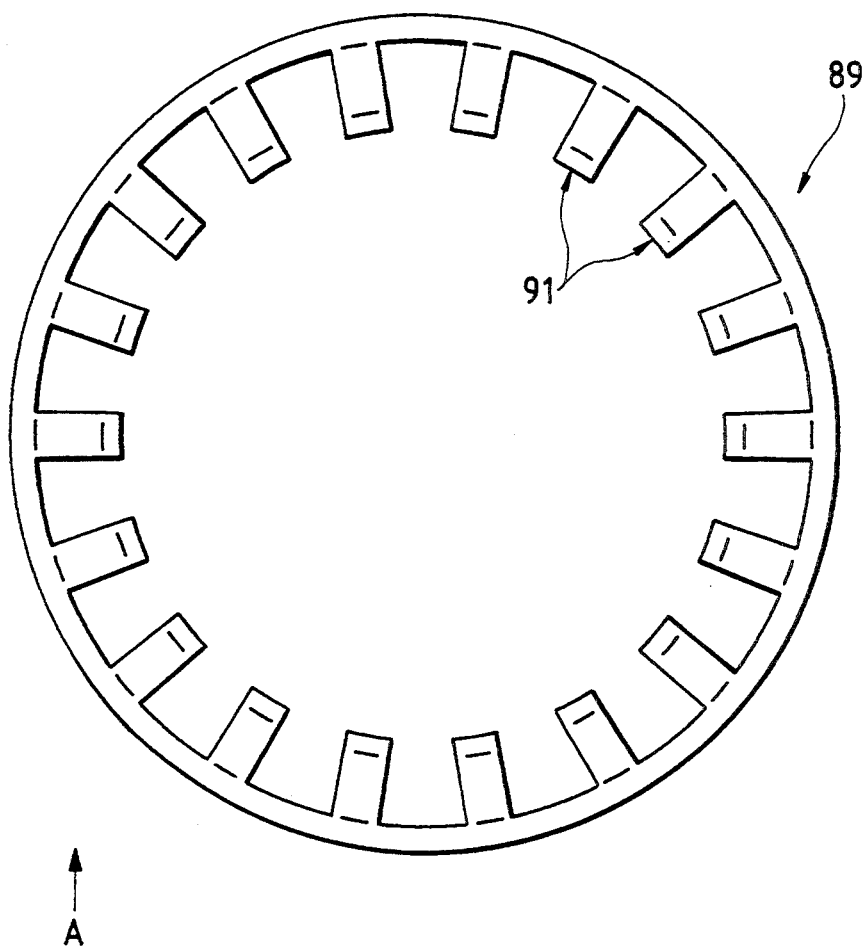
FIG. 14 shows a top view of a leaf spring of an eighth embodiment of the ultrasonic wave motor of the present invention.

FIG. 14 shows a shape of a leaf spring in an eighth embodiment of the present embodiment.

A plurality of leaf springs 91 comprising a plurality of projections projecting toward a center at a predetermined pitch angle are integrally formed on a ring-shaped plate 89 at a constant pitch.

Figure 15:
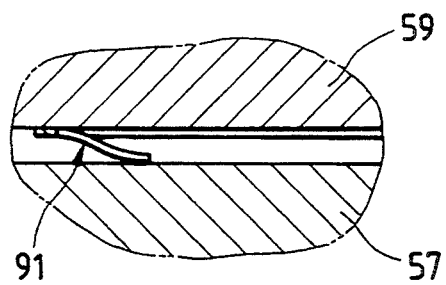
FIG. 15 shows a side elevational view of the leaf spring of FIG. 14, viewed in a direction A in FIG. 14.

As shown in FIG. 15, the leaf springs 91 press the pressure transmission member 57, to transmit the pressure of the pressure control member 59 to the movable body 55 in FIG. 1.

The present embodiment attains substantially the same effects as those of the sixth embodiment.

Figure 16:
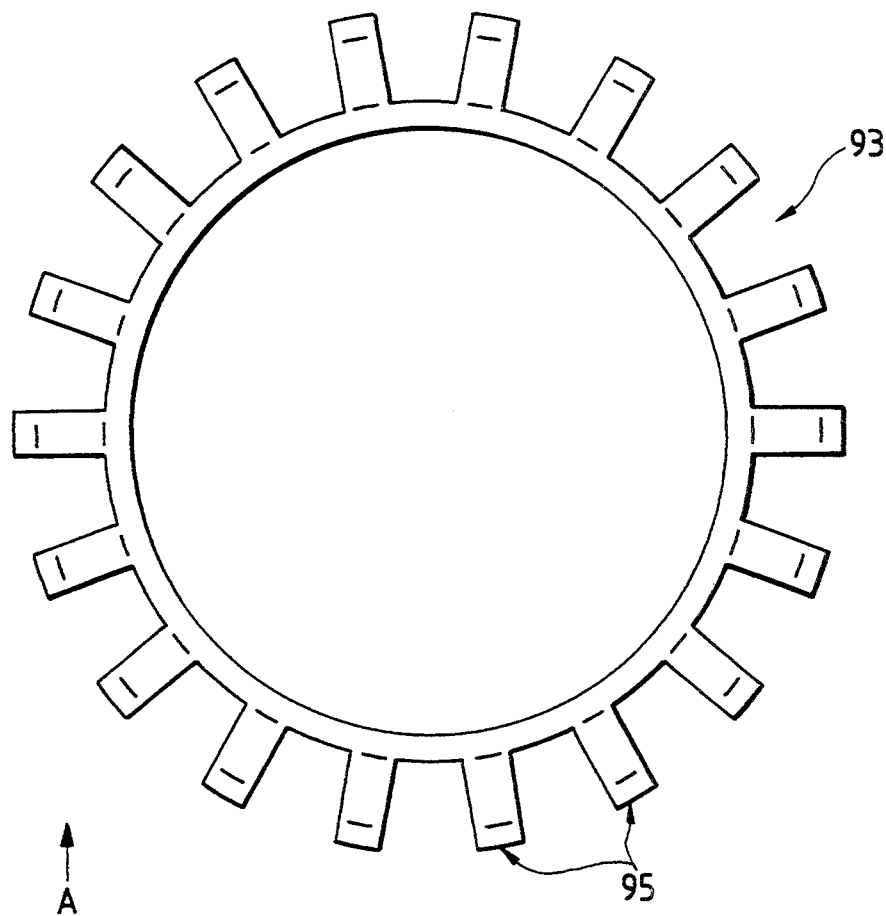
FIG. 16 shows a top view of a leaf spring of a ninth embodiment of the ultrasonic wave motor of the present invention.

FIG. 16 shows a shape of a leaf spring in a ninth embodiment of the present invention.

A plurality of leaf springs 95 comprising a plurality of projections projecting outward radially are integrally formed on a ring-shaped plate 93 at a constant pitch.

Figure 17:
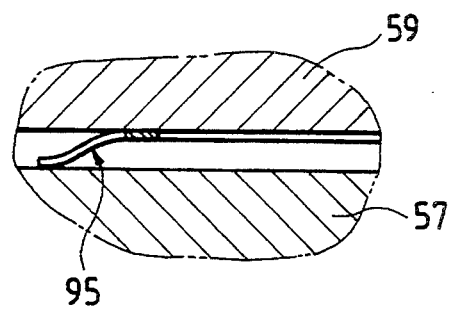
FIG. 17 shows a side elevational view of the leaf spring of FIG. 16, viewed in a direction A in FIG. 16.
Figure 18:
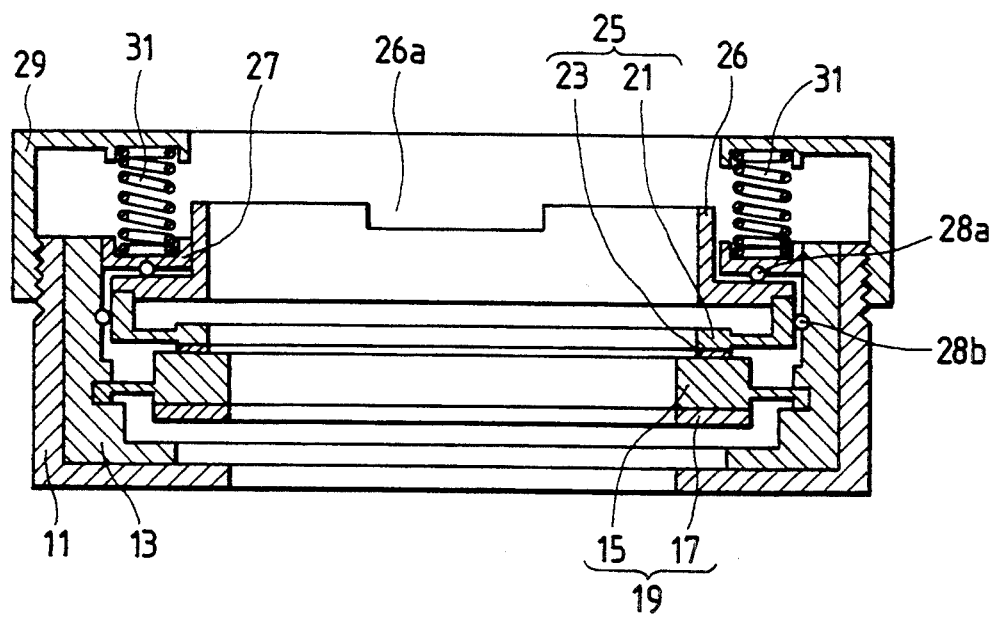
FIG. 18 shows a sectional view of a prior art ultrasonic wave motor.
Figure 19:
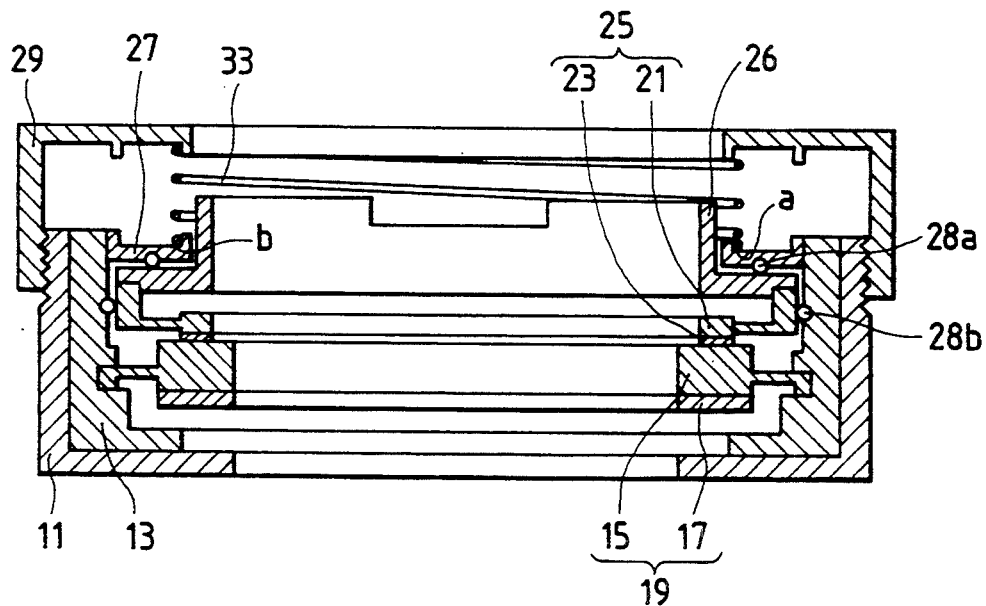
FIG. 19 shows a sectional view of a prior art ultrasonic wave motor.
Figure 20:
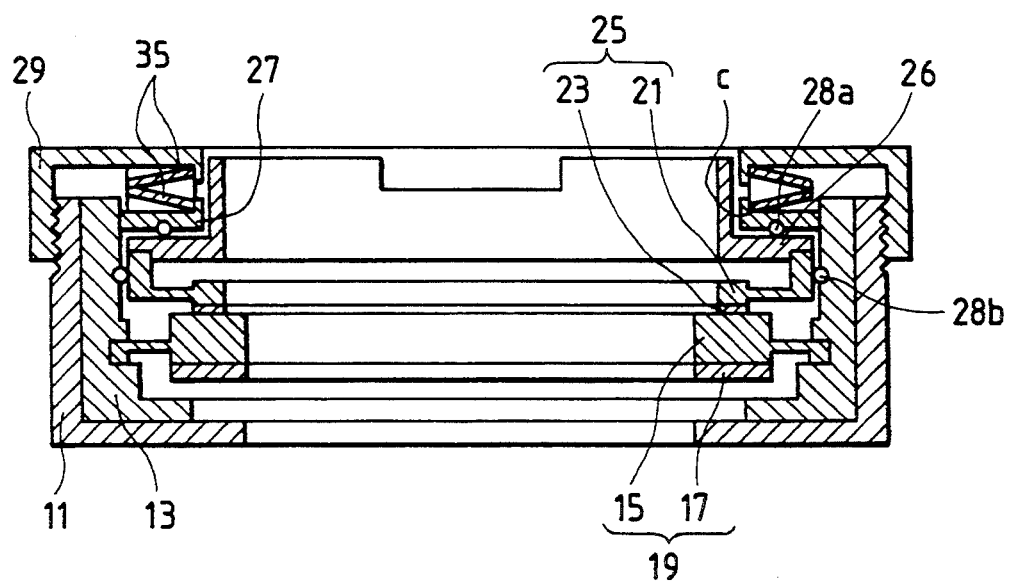
FIG. 20 shows a sectional view of a prior art ultrasonic wave motor.
Figure 21:
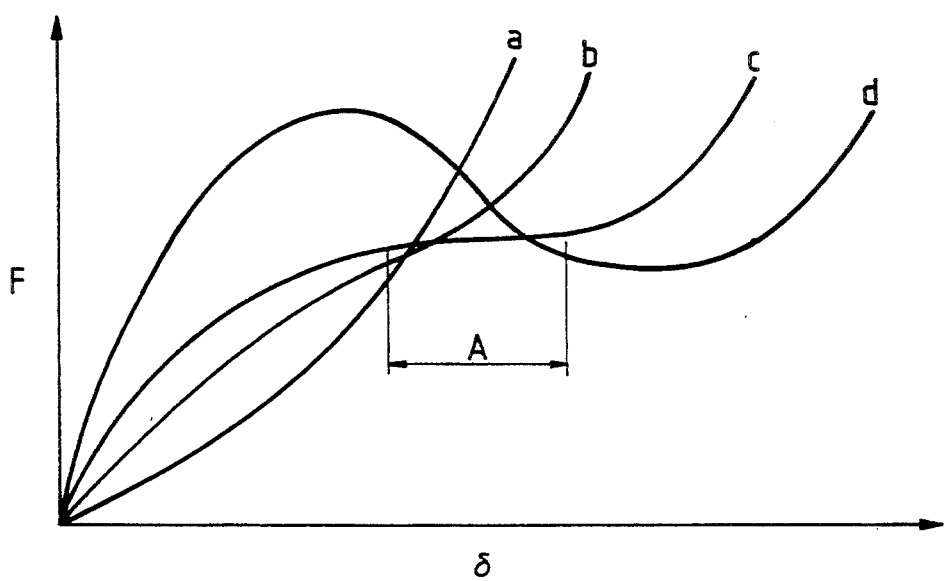
FIG. 21 shows a relation between a load and a flexure of a dish-shaped spring.

As shown in FIG. 17, the leaf springs 95 press the pressure transmission member 57, to transmit the pressure of the pressure control member 59 to the movable body 55 in FIG. 1.

The present embodiment attains substantially the same effects as those of the eighth embodiment.

In the ultrasonic wave motor of the present invention, since the vibration member and the movable body are pressed by the leaf springs, the load variation can be reduced by using leaf springs having a small spring coefficient.

Leaf springs of the same shape can be mass-produced by pressing and the variation of loads of leaf springs can be reduced so that the vibration member and the movable body can be uniformly pressed in the contact plane.

Further, since the leaf springs save space very much compared to the coiled springs, an ultrasonic wave motor of compact size is attained.

The leaf spring has a relatively large freedom of design in determining the spring coefficient and it is easy to reduce the spring coefficient to precisely initially set the pressures of the vibration member and the movable body or reduce the aging change of the pressure. Thus, an ultrasonic wave motor having a stable characteristic is provided.

Unlike the dish-shaped spring, the leaf spring has a linear spring characteristic. Therefore, a risk of an abrupt change of the spring characteristic due to a dimension error is solved.

Since a plurality of leaf springs can be integrally formed by projecting them from one plate, the assembling work is improved.

Various shapes of leaf springs may be readily used without losing the above advantages so that the freedom of design is significantly improved over the prior art.

What is claimed is:

1. An ultrasonic wave motor comprising:
   a vibration member for generating a travelling vibration wave;
   a movable member driven by said vibration member; and
   a pressing mechanism for pressing either said vibration member or said movable member so that said vibration and movable members become close to each other, said pressing mechanism including a plate portion with a small thickness along an axial direction, and a spring formed by a plurality of projections radially and axially extending from said plate portion, said projections being T-shaped, ends of said T-shaped projections pressing either said vibration member or said movable member.

2. An ultrasonic wave motor according to claim 1, wherein said pressing mechanism further includes a pressing force adjusting member, and said plate portion is attached to said pressing force adjusting member.

3. An ultrasonic wave motor comprising:
   a vibration member for generating a travelling vibration wave;
   a movable member driven by said vibration member; and
   a pressing mechanism for pressing said vibration and rotation members toward each other, said pressing mechanism including a base plate and a plurality of springs, each of said springs being formed by an elastic plate spring member having an attaching portion attached to said base plate by an attaching member, a pressing portion, and an abutting portion abutting said base plate during pressing without attachment to said base plate.

4. An ultrasonic wave motor according to claim 3, wherein each of said springs is formed by bending a thin plate into an arch, one end of the arch has said attaching portion and an opposite end has said abutting portion.

5. An ultrasonic wave motor according to claim 3, further comprising a bearing, wherein said pressing mechanism presses said movable member through said bearing.

6. An ultrasonic wave motor comprising:
   an annular vibration member for generating a travelling vibration wave;
   an annular rotation member driven at one side thereof by said vibration member; and
   a pressing mechanism including a spring at the opposite side of said rotation member for pressing said rotation member toward said vibration member, said spring comprising a thin annular plate having a plurality of projection portions disposed sequentially around the circumference of the plate, each projection portion projecting toward said rotation member and being formed as an arch bent from said plate, integral with said plate at opposite ends of the arch, and extending circumferentially of said plate.

7. An ultrasonic wave motor comprising:
   an annular vibration member for generating a travelling vibration wave;
   an annular rotation member driven by said vibration member; and
   a pressing mechanism including a spring for pressing so that said annular vibration member and said annular rotation member approach each other, said spring having an annular plate portion, a projection portion radially projecting from said plate portion in substantially the same plane, and a pressing portion circumferentially extending from said projection portion and pressing one of said annular vibration and rotation members toward the other of said annular vibration and rotation members, without abutting said annular plate portion, a length of said pressing portion in a circumferentially direction being designed so as to provide a low spring coefficient.

8. An ultrasonic wave motor according to claim 7, wherein said pressing portion is bent axially.

9. An ultrasonic wave motor according to claim 7, wherein said protection portion projects from said plate portion inwardly.

10. An ultrasonic wave motor according to claim 7, wherein said protection portion projects from said plate portion outwardly.

11. An ultrasonic wave motor according to claim 7, wherein said pressing mechanism further includes a bearing, and said spring presses one of said annular vibration and rotation members through said bearing.

12. An ultrasonic wave motor according to claim 7, wherein said pressing mechanism further includes a pressing force adjusting member, and said plate portion is attached to said pressing force adjusting member.

13. An ultrasonic wave motor according to claim 7, wherein at least four projection portions are provided at said plate portion.

14. An ultrasonic wave motor comprising:
   an annular vibration member for generating a travelling vibration wave;
   an annular rotation member driven by said vibration member; and
   a pressing mechanism including a spring for pressing so that said annular vibration member and said annular rotation member approach each other, said spring having an annular plate portion, a projection portion radially projecting from said plate portion in substantially the same plane, and a pressing portion circumferentially extending from said projection portion and pressing one of said annular vibration and rotation members toward the other of said annular vibration and rotation members, without abutting said annular plate portion, said pressing portion being included relative to said plane and having no part extending parallel to the axis of said motor.

15. An ultrasonic wave motor according to claim 14, wherein said pressing portion is bent axially.

16. An ultrasonic wave motor according to claim 14, wherein said protection portion projects from said plate portion inwardly.

17. An ultrasonic wave motor according to claim 14, wherein said protection portion projects from said plate portion outwardly.

18. An ultrasonic wave motor according to claim 14, wherein said pressing mechanism further includes a bearing, and said spring presses one of said annular vibration and rotation members through said bearing.

19. An ultrasonic wave motor according to claim 14, wherein said pressing mechanism further includes a pressing force adjusting member, and said plate portion is attached to said pressing force adjusting member.

20. An ultrasonic wave motor according to claim 14, wherein at least four projection portions are provided at said plate portion.

* * * * *